A. VISCHER, Jr.
CONTAINER.
APPLICATION FILED MAR. 1, 1919.
1,326,124. Patented Dec. 23, 1919.
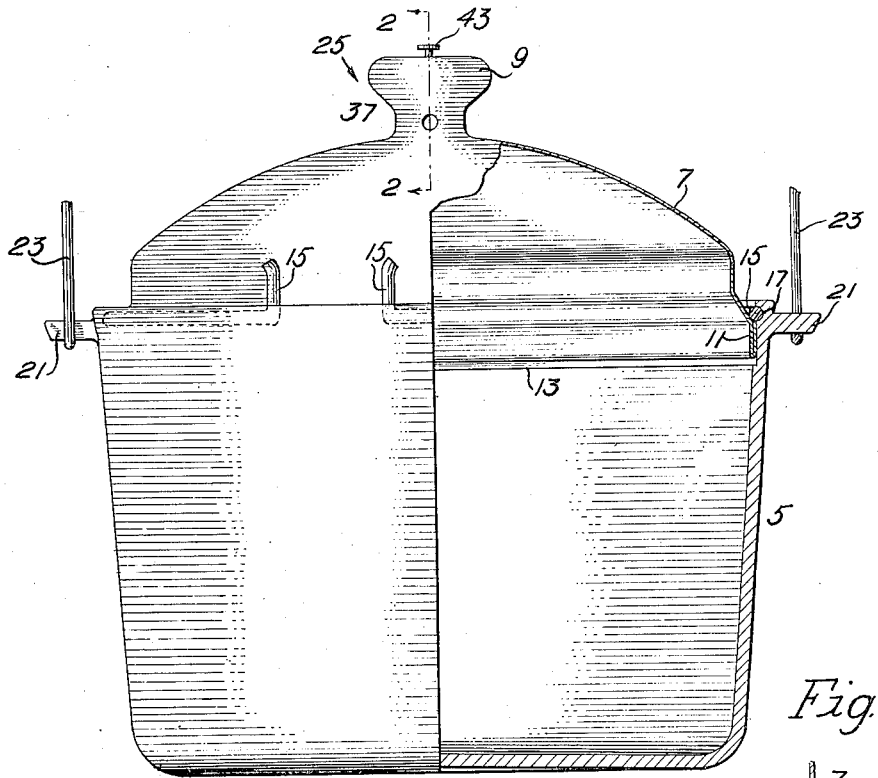
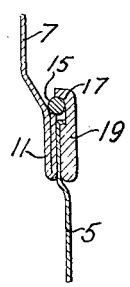
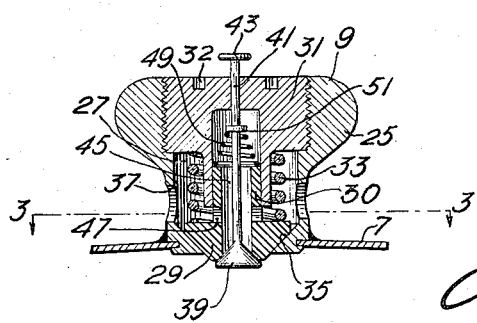
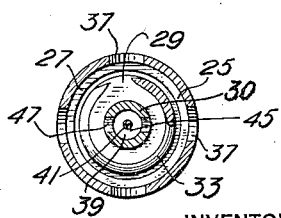

UNITED STATES PATENT OFFICE.

ALFRED VISCHER, JR., OF NEW YORK, N. Y.

CONTAINER.

1,326,124.  Specification of Letters Patent.  Patented Dec. 23, 1919.

Application filed March 1, 1919. Serial No. 279,949.

*To all whom it may concern:*

Be it known that I, ALFRED VISCHER, Jr., a citizen of the United States, and a resident of the city of New York, in the county of Kings and State of New York, have invented an Improvement in Containers, of which the following is a specification.

This invention relates to containers, and with regard to certain more specific features, to a receptacle of the type known as pressure cookers, in which cooking is done under appreciable pressure, as distinguished from the cooking that is done in open vessels or in vessels from which the steam or other vapor escapes if the pressure thereof rises above a nominal amount.

Among the several objects of the invention may be noted the provision of an inexpensive container having a closure adapted normally to be retained in position on the container during cooking, but readily removable from the container at the will of the operator; and the provision of a container adapted to be heated and having its parts so constructed that at super-normal temperatures the parts tend automatically to remain in position, while at normal temperatures they are readily separable. Other objects will be in part obvious and in part pointed out hereinafter.

The invention accordingly comprises the features of construction and operation, combinations of elements and arrangements of parts which are exemplified in the structure hereinafter described and the scope of the application of which will be indicated in the following claims.

In the accompanying drawings, in which are shown two of various possible embodiments of this invention, Figure 1 is an elevation partly in section of a preferred form of container.

Fig. 2 is a vertical section on the line 2—2 of Fig. 1, showing the valve construction on an enlarged scale.

Fig. 3 is a horizontal section on the line 3—3 of Fig. 2, showing a portion of the valve structure.

Fig. 4 is a fragmentary vertical section of a modified form of container.

Similar reference characters indicate corresponding parts throughout the several views of the drawings.

Referring now more particularly to Fig. 1, there is illustrated a container having the side or body or main portion 5 of a suitable material, such as cast iron, and a lid or cover or closure 7 constructed preferably of aluminum. A valve 9 in the cover permits escape of fluid from the container whenever the pressure of said fluid exceeds a predetermined amount, or at any time at the will of the operator. The lid terminates in an annular flange 11 which at normal or room temperatures has a sliding fit within the upper inner edge of the body 5, but which at super-normal temperatures is pressed tightly against said body owing to the fact that the lid is of a material having a higher temperature coefficient of expansion than the body. Furthermore, the flange 11 is one of the hottest parts of the container, owing to the fact that the flange is protected from the outside air by the adjacent part of the body; this is advantageous because it effects a tighter joint than would be obtained if the flange were at a lower temperature.

A shoulder 13 on the inner edge of the body 5 limits the downward or inward movement of the lid. A spring ring 15 is normally fitted in a recess 17 adjacent the upper inner edge of the body 5, and tends to prevent the cover from being removed from the body of the container.

When the body is of cast iron or other material, thick enough so that its upper edge resists the expansion of the lid flange sufficiently to form a tight joint therewith, no reinforcement, such as the band around the body, is needed. When, however, the body is made of light sheet material, such as sheet aluminum (Fig. 4), a band 19 is preferably used, to insure a fluid-tight joint between the body and the flange of the lid. In some instances when this confining band 19 is used, it is possible to make the body and cover of the same material, provided the band is of a material of a lower coefficient of expansion, because in such cases the band exerts its force through the material of the cover to resist the more rapid expansion of the flange of the lid, and thus insure the desired pressure-tight joint. The band is preferably of nickel steel or other material having a lower temperature coefficient of expansion than the material, such as aluminum, of which the body and cover are made.

Extending outwardly from the upper portion of the body, in both of the illustrated embodiments of the invention, are lugs 21 on which a bail or handle 23 is mounted.

The valve 9 above mentioned comprises a knob or handle 25 on the lid 7, centrally apertured as at 27, to receive a valve head 29 mounted on a stem 30, a bearing 31, threaded into the knob 25, and a compression spring 33 mounted between the head 29 and the bearing 31. The bearing is provided with a pair of holes 32 to receive a spanner; or other means may be provided to facilitate the insertion and removal of the bearing, with or without the use of a tool. The spring tends to force the head downwardly into contact with the valve seat 35, which in this instance is an integral part of the knob 25. Perforations 37 in the knob at a point adjacent the spring permit egress of fluid from the container through the space between the head and seat when the pressure in the container tending to force the head away from the seat exceeds the force exerted by the spring 33 to hold the head upon the seat. The valve thus opens automatically to relieve the pressure within the container whenever such pressure exceeds a predetermined amount.

In addition to this automatically-operating valve mechanism, the device is provided with a second valve head 39 coöperating with the valve head 29, which serves as a seat for the second valve. Mounted upon or integral with the second valve head 39 is a stem 41 terminating in a button or knob 43 accessible to the operator and adapted when pushed inwardly with respect to the knob 25, to force the inner head 39 inwardly away from the outer head 29 to open the inner or second valve and permit egress of fluid from the container through the space 45 between the inner stem 41 and outer stem 30, thence through the perforations 47 in the latter, into the aperture 27, whence the fluid escapes to the atmosphere through the perforations 37 above described.

A compression spring 49 may be mounted between the outer stem 30 and a collar 51 on the inner stem 41, to retain the inner or manually-operated valve normally in closed position. This inner spring can be of light construction compared with the outer spring 33, inasmuch as the former needs to overcome simply the weight of the inner stem 41 and parts movable therewith. When there is appreciable pressure within the container, such pressure assists the inner spring in keeping the inner valve closed.

The clearance between the collar 51 and the bearing 31 should be at least as great as the travel of the outer head 29, since such travel causes the collar to move outwardly and therefore toward the adjacent surface of said bearing. If the clearance is less than the travel of the outer valve, then when the outer valve moves in opening direction, such movement is opposed by the combined forces of the two springs after the movement has caused the collar 51 to abut against the adjacent surface of the bearing 31. For many purposes this action is not detrimental, particularly as it causes the separation of the inner head 39 and the outer head 29, thereby affording an additional path for egress of fluid from the container.

When the container is at temperatures above normal, the expansion of the lid with respect to the body (if the two parts are of unequal temperature coefficient), or the expansion of the lid with respect to the band 19 (if the lid and body are of the same temperature coefficient and a band 19 is provided), causes the flange 11 of the lid to fit tightly against the inner surface of the body, to form therewith a pressure-tight joint. This makes it possible to dispense with the clamping devices commonly employed to insure a pressure-tight joint, and in view of the fact that at normal temperatures this joint between lid and body is simply a sliding fit, it is possible for the operator to put the lid on and off at normal temperatures with ease.

The device may be operated as follows: The body 5 is filled with suitable materials or ingredients. The cover is then slipped into the body until the flange 11 of the cover abuts against the shoulder 13 on the body. The spring ring 15 is then held in compressed position by the fingers and inserted into the recess 17, the outwardly extending portion 53 of the cover adjacent the flange 11 being out of contact with the ring because the cover is at this time pushed inwardly farther than the position indicated for it in Fig. 1. When the spring ring 15 is in place, the lid may be pulled outwardly far enough to bring the flange 11 against the ring; this is not at all necessary, because the pressure within the container as soon as cooking gets under way, will cause this movement automatically, and if it does not do so, the device will ordinarily operate just as well as if the movement had been effected. The container is now ready to be heated. This heating ordinarily causes the pressure within the container to rise above the atmospheric pressure. This heating automatically causes the joint between flange 11 and cover 7 to be pressure tight for the reasons above indicated. The internal pressure within the container can be relieved at any time to any desired extent by pushing the knob or button 43 inwardly manually. Excessive pressure is automatically relieved by the opening of the valve head 29. When the lid is to be removed, the internal pressure can be partly or entirely relieved by pushing the button 43 inwardly; the lid can be cooled by dashing cold water over it or in any other suitable way. When the lid has cooled, it may easily be pushed inwardly until its flange 11 abuts against the shoulder 13 on the body, whereupon the spring ring 15 can be compressed with the fingers and removed from the groove 17, after which the lid 7 can be easily pulled out of the body portion. If a partial vacuum is formed within the container at any time, due to cooling of the container, such vacuum is automatically relieved by the opening movement of the inner valve head 39, which opens as soon as the excess of atmospheric pressure over internal pressure, acting on the upper surface of the valve head, exceeds the force exerted by the inner spring 49 tending to keep the inner valve head in closed position against the outer valve head 29; or such vacuum can be relieved manually by pushing inwardly the button 43 at any time.

In view of the above, it will be seen that the several objects of the invention are achieved and other advantageous results attained.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim:

1. A container combining a body and a closure, and means tending to retain the latter in position on the former, the body and closure having unequal thermal coefficients of expansion, the two parts being readily separable at normal or room temperatures but said parts being so arranged as to form, by virtue of said unequal coefficients, a sealing contact with one another at super-normal temperatures.

2. A container combining a body and a closure, the body and closure having unequal thermal coefficients of expansion, the two parts being readily separable at normal or room temperatures but said parts being so arranged as to form, by virtue of said unequal coefficients, a sealing contact with one another at super-normal temperatures.

3. A container combining a body, a closure having a flange, and resilient means tending to retain the closure in position on the body, the closure having a higher thermal expansion coefficient than the body, the two parts being readily separable at normal or room temperatures, and the flange of the closure fitting snugly within the mouth of the body and being adapted to form a sealing contact therewith, by virtue of the higher expansion coefficient of the closure, when the parts are at super-normal temperatures.

4. A container combining a body and a closure, and means tending to retain the latter in position on the former, the body and closure having unequal thermal coefficients of expansion, the two parts being readily separable at normal or room temperatures, and the closure fitting snugly the mouth of the body and being adapted to form a sealing contact therewith, by virtue of the unequal expansion coefficient of body and closure, when the parts are at super-normal temperatures.

In testimony whereof, I have signed my name to this specification this 28th day of February, 1919.

ALFRED VISCHER, Jr.